United States Patent Office 3,838,045
Patented Sept. 24, 1974

3,838,045
TREATMENT OF AQUEOUS SUSPENSIONS OF ORGANIC WASTE MATERIALS
Eric J. Clayfield, Mickle Trafford, near Chester, England, assignor to Shell Oil Company, New York, N.Y.
No Drawing. Filed June 29, 1972, Ser. No. 267,281
Claims priority, application Great Britain, July 15, 1971, 33,216/71
Int. Cl. B01d 11/00
U.S. Cl. 210—52                9 Claims

ABSTRACT OF THE DISCLOSURE

The separability of water from aqueous organic waste material suspensions is substantially improved by the addition of an acidified aqueous emulsion containing a mineral oil based liquid and an amino nitrogen or quaternary nitrogen-containing cationic surfactant.

BACKGROUND OF THE INVENTION

The invention relates to a process for the dewatering of an aqueous suspension of organic waste material.

Domestic and industrial effluents containing waste material are produced in abundant quantities in technologically advanced societies and if not properly treated can cause pollution of water courses, land and the atmosphere. Effluent treatment processes must cope with large amounts of effluent which have a great complexity and range of composition in order to produce clean potable water supplies to satisfy domestic and industrial requirements.

A few examples will be given of aqueous suspensions of organic waste materials which must be disposed of, and which become available as such e.g., from factories and/or households, or which are formed at the end of a preliminary treatment for purification or domestic and/or industrial effluents.

Sewages which reach sewage plants in most cases will contain domestic and/or industrial waste material in amounts of from 0.01 to 0.2% or more (even up to 2% w.) of dry solids which for the greater part must be removed in sewage treatment process. In general the raw sewage is passed through a disintegrator to reduce the amount of coarse waste. Inert sand and gravel which cause excessive wear of the sewage pumps are typically removed in a sand catch or grit chamber. Suspended solids consisting mainly of organic material are subsequently separated in primary settling tanks and removed. They form a sludge, which in general has a solids content from 2 to 8% w. The expression "sludge" as used in the present specification denotes an aqueous suspension of organic waste material which has had some time to settle.

The liquid effluent of the primary settling tanks is in most cases subsequently subjected to an aerobic biological treatment, e.g., by means of trickling filters or with the aid of an activated sludge process. In both cases an amount of sludge is formed which can be combined with the sludge obtained from the primary settling tanks described. The total mixed sludge so obtained is usually anaerobically digested in a digestion tank which reduces the bulk of the sludge and renders it innocuous.

The digested sludge so obtained must be disposed of, for example, by dumping at sea, at land or in lagoons. These alternatives, however, are unattractive from the standpoint of environmental hygiene, and in the latter two cases are wasteful in land utilization and produce unpleasant odors. Other methods for disposing digested sludge have been proposed such as vacuum filtration, coil filtration and centrifuging, in order to dewater the digested sludge (which in general contains from 2–10% solid material) and thus decrease the amount of material which must be disposed of. Preferably the digested sludge is dewatered to such an extent that the organic solids can easily be disposed of, e.g., by means of a combustion process. However, centrifuging is expensive and digested sludge is only filterable with difficulty. For this reason chemical conditioning has been used to promote flocculation and to increase filtration rate. It is desirable that the filter cake obtained will have just enough calorific value to obviate the need for auxiliary fuel in a combustion process (in other words: be autothermic). This aim cannot but with great difficulty be achieved with present methods.

An example of another waste containing effluent which can only be freed from suspended organic material with difficulty is paper mill effluent. This effluent consists in general of a very dilute suspension (about 0.1–0.5% w. of solids). Filtration can be carried out here at a satisfactory rate, but the filtrate often is not clear and the filter cake not autothermic.

The present invention provides a solution for the dual problems of filterability of sewage sludges and the preparation of autothermic concentrates (e.g., filter cakes) from aqueous suspensions of organic waste materials.

SUMMARY OF THE INVENTION

It has now been found that an aqueous suspension of organic waste can be dewatered in a highly efficient manner by mixing the suspension with mineral oil based liquid and a cationic surfactant preferably in the form of an aqueous emulsion, followed by separation of an aqueous phase. It has been further found that substantially increased separation rates can be achieved if the cationic surfactant-containing emulsions utilized to treat the organic waste material suspensions are acidified as hereinafter discussed. It will be understood that the solid material in the aqueous suspensions of organic waste materal will not consist entirely of organic material. Dependent on the source of the waste material, appreciable amounts of inorganic material may be present. The amounts of inorganic material in the solid material of the aqueous suspensions of waste material may be as high as 70% w. These suspensions are still considered suspensions of organic waste material within the context of the present description and accompanying claims. An example of an aqueous suspension of an organic waste material which contains about 50% w. of inorganic material is paper mill effluent. The inorganic material in this effluent is generally clay.

The process according to the invention is preferably applied to sewage sludges, in particular digested sewage sludges and paper mill effluents. It is sometimes advantageous to elutriate the aqueous suspensions of organic waste material before the process according to the invention is carried out.

DESCRIPTION OF EMBODIMENTS

Mineral oil based liquids which may be employed in accordance with the invention include any liquid which consists predominantly of materials obtained from a crude mineral oil by conventional processes in the oil industry such as distillation, extraction, dewaxing, precipitation, thermal and catalytic cracking, hdyrofining, hydrocracking. The term "mineral oil" as used in this specification and accompanying claims not only includes oils obtained from subsurface resources, but also shale oils, oils obtained from tar sands and the like. In general the mineral oil based liquid to be used in the process of the present invention will have an initial boiling point above 200° C. and consequently will not contain an appreciable amount of volatile components. Gas oils, fuel oils, lubricating oils obtained by vacuum distillation and liquid residual fractions of crude oil distillation or mixtures of these liquid are very suitable. Bitumens obtained as a residue from the vacuum distillation of a naphthenic crude mineral oil or by precipitation from the residue of vacuum distillation of a paraffinic crude oil can also be advantageously employed. Since these bitumens are very viscous, it is of advantage to blend them with a mineral oil fraction. This fraction may be distillate or a residual fraction or a mixture thereof. These blends, which are also called cutbacks are very suitable for use in the process according to the invention, in particular cutbacks of bitumens which have been obtained by precipitation, preferably with propane (so-called propane bitumens).

Surfactants generally consist of molecules containing hydrophilic and hydrophobic moieties, the latter usually comprising alkyl-chains. In cationic surfactants the hydrophobic moieties of the molecules bear a positive charge when dissolved in aqueous media. The hydrophobic moieties of the cationic surfactants employed in the present process contain amino nitrogen atoms or quaternary nitrogen atoms.

Examples of cationic surfactants which can be suitably employed in accordance with the invention include aliphatic mono-, di- and polyamines and rosin-derived amines containing a long alkyl chain, of e.g., at least 8 carbon atoms. Preference is given to n-alkyl propylene diamines, alkyl imidazolines and alkyl imidazolidines, wherein the alkyl groups contain from 10 to 24 carbon atoms. These alkyl groups are often of vegetable origin and consists of e.g., coca alkyl-, tallow alkyl- or soya alkyl groups.

Salts of the amines mentioned, e.g., salts of carboxylic acids may also be used, for example, salts of acetic acid, naphthenic acids or oleic acids. The amines are often marketed in the form of salts of carboxylic acids and may be used as such.

Amine oxides containing alkyl chains with from 10 to 24 carbon atoms in the alkyl chain are also very suitable to be used in the process according to the invention.

A further type of cationic surfactant which is also very useful consists of polyoxyalkylene derivatives, of alkyl mono-, di- or polyamines. 2 - Alkyl-1-(hydroxyethyl)-2-imidazolines are also suitable.

Amines which contain amide linkages, and which can be prepared by reaction of carboxylic acids (generally natural fatty acids having from 10–24 carbon atoms such as coconut, oleic, stearic or tall oil fatty acids) with di- or polyamines, can also be used.

Quaternary ammonium salts can also be used as cationic surfactants in the process according to the invention. These salts are in general derived from inorganic acids, in particular hydrobromic and hydrochloric acid. These salts generally have one or two alkyl groups containing from 10 to 24 carbon atoms attached to the quaternary nitrogen atom.

Mixtures of the aforementioned cationic surfactants may also be employed. Mixing of the aqueous suspension with the mineral oil based liquid and the cationic surfactant may be carried out in any desired way. Very conveniently mixing is effected with the aid of compressed air or with very quickly rotating stirrers, which equipment is well known in the sewage treatment industry.

While the mineral oil based liquid and the cationic surfactant may be added separately to the aqueous suspension of organic waste material, it has been found very advantageous to prepare an aqueous emulsion of the mineral oil based liquid and the cationic surfactant and utilize this emulsion to treat the suspension of organic waste material. In addition, it has been found that acidification of the cationic surfactant-containing emulsion has a significant effect on the rate of separation of the aqueous phase, particularly if separation is accomplished by filtratration. Acids which may be suitably employed to acidify the cationic surfactant-containing emulsions include strong acids such as hydrochloric acid, as well as weak acids such as acetic acid. The amount of acid added to the aqueous emulsion may vary between wide limits, e.g., from an equivalent of the cationic surfactant up to 1 part by weight of the amount of water used for the preparation of the emulsion.

Preferred aqueous emulsions comprise a mineral oil based liquid (particularly a cutback of a precipitation bitumen, preferably a propane bitumen), a cationic surfactant, water and an acid (particularly acetic or hydrochloric acid).

The amount of the mineral oil based liquid and cationic surfactant added to the aqueous suspension of organic waste material will vary depending on type and amount of solid material present in the suspension of organic waste material.

It is thought that the mineral oil based liquid forms bridges between solid particles present in the suspension without covering the whole surface of each particle. The surfactant is thought to cover those parts of the solid particles where no mineral oil based liquid is present resulting in an open flocculated structure, no dense agglomerates being formed from the suspended solid particles.

From this hypothesis, wherefrom no limitation with respect to the scope of the present invention should be inferred, it may be gathered that large amounts of mineral oil based liquid based on solid organic waste material are not necessary. On the other hand, sufficient mineral oil based liquid must be added in order to obtain an autothermic product upon dewatering of the suspension of organic waste material.

It has been further found that the mineral based liquid remains attached to the solid particles during separation of the aqueous phase in accordance with the invention, thus permitting the recovery of an aqueous phase which is substantially free of organic substances. Since the calorific value of the mineral oil based liquid is higher than that of the organic solid material present in the aqueous suspension, the calorific value of the sludge or filter cake obtained after separation of the aqueous phase will be higher than that of a sludge or filter cake obtained without addition of a mineral oil based liquid. Owing to this increase in calorific value, mineral oil based liquid can be used in such an amount that autothermic sludges or filter cakes are obtained. The requirements for being autothermic concerning calorific value of combustible material and the water content of sludges have been calculated and recorded in the Report of the Water Pollution Research Laboratory Steering Committee 1969, published by the Ministry of Technology (London) p. 104.

Amounts of the mineral oil based liquid from 10 to 100% w. based on the total amount of solids present in the aqueous suspension of organic waste material, are very suitable. The amount of cationic surfactant preferably used depends on the type of the surfactant, its activity and the amount and type of organic waste material present. In general, amounts from 0.01 to 10% w. based on the total amounts of solids present in the aqueous suspension of organic waste material are suitable. Preferably the weight ratio of mineral oil based liquid to the cationic surfactant should be between 25 and 4.

In accordance with the invention, after the suspension of organic waste material is mixed with the aqueous emulsion containing the mineral oil based liquid and the surfactant, an aqueous phase is separated therefrom. This separation can be carried out in any desired way (such as by settling, decantation, or centrifuging), but it is preferably accomplished by filtration. In particular with sewage sludges, the rate of filtration is sharply increased by the addition of the cationic surfactant-containing aqueous emulsion to the suspension of waste material. Filtration can be conveniently carried out with equipment well known in the sewage treatment art such as precoat filters, filter presses and in particular with rotary vacuum filters.

EXAMPLES

The rates of filtration of two digested sewage sludges and a paper mill effluent was determined with the aid of the following methods: A method for the determination of the specific resistance (S.R.F.) as described by J. D. Swanwick and M. F. Davidson in Water and Waste Journal, July/August 1961; a method for the determination of the capillary suction time (C.S.T.) as described by R. C. Baskerville and R. S. Gale, J. Inst. Water Pollution Control No. 2, 1968; and a filter leaf test as described by B. A. Schepman and C. F. Cornell in Sewage and Industrial Wastes Volume 28, p. 1443–1460 (1956). The specific resistance to filtration provides a quantitative measure of the dewatering characteristics of aqueous suspensions of organic waste materials. The SRF values and the CST values are interrelated and it has been found for sewage sludges that a linear relationship exists for a given sewage sludge, a given surfactant and a given mineral oil based liquid. The ratio of the SRF (in $sec.^2 g.^{-1}$) to the CST of the sludge minus the CST of the filtrate (both in seconds) found was in the range from about $10^7$ to $10^9$. The filter leaf test provides results which are representative for results obtained on a plant size vacuum filter.

EXAMPLE I

To a digested sludge obtained from domestic sewage containing about 3% w. of solid material, was added an emulsion prepared from 1 p.b.w. of lubricating oil, 3 p.b.w. of water, 3 p.b.w. of acetic acid of 80% strength and several amounts of different cationic surfactants. The cationic surfactants used were a commercial oleyl propylene diamine (I), a commercial tallow amine acetate (II), and a commercial stearyl propylene diamine (III). The emulsion was added to the digested sludge in an amount that 1% w. of the lubricating oil was present, calculated on total digested sludge. The CST times in seconds have been recorded in Table A. The concentration of the cationic surfactants given are calculated on total digested sludge.

TABLE A

| Cationic surfactant | Capillary suction times (C.S.T.), seconds— | | |
|---|---|---|---|
| | I | II | III |
| Concentration, percent: | | | |
| 0 | 333.7 | 333.7 | 333.7 |
| 0.050 | 106.6 | | 72.0 |
| 0.075 | 66.2 | 87.8 | 38.3 |
| 0.100 | 17.0 | 16.9 | 17.1 |
| 0.150 | 10.1 | 19.7 | 11.1 |
| 0.200 | 11.1 | 15.5 | 11.1 |

A C.S.T. time of about 20 seconds or below is considered to indicate an attractive filtration rate.

EXAMPLE II

To the digested sewage sludge described in Example I were added emulsions prepared from 1 p.b.w. of a lubricating oil, 3 p.b.w. of water, 1 p.b.w. of acetic acid of 80% strength, and different amounts of a commercial N-tallow propylene diamine (V) as surfactant. The emulsions were added in such an amount that 1% w. of the lubricating oil was present, calculated on total digested sludge. The amounts of surfactant were chosen in such a way that capillary suction times from 10 to 40 seconds were obtained. Each sample was also tested in the specific resistance to filtration test. The results, as given in Table B, show that a nearly linear relation exists between the SRF and the CST of each sludge reduced with the CST of the filtrate, the latter being 7 seconds.

TABLE B

| | | | | |
|---|---|---|---|---|
| Capillary suction time C.S.T. | 11 | 13 | 16 | 40 |
| Specific resistance to filtration (SRF) $sec.^2 g.^{-1}$ ($\times 10^{-8}$) | 5.0 | 7.2 | 12.8 | 47 |
| C.S.T. sludge, C.S.T. filtrate | 4 | 6 | 9 | 31 |
| SRF/(C.S.T. sludge, C.S.T. filtrate) ($\times 10^{-8}$) | 1.25 | 1.2 | 1.4 | 1.5 |

EXAMPLE III

The digested sewage sludge described in Example I was treated with an emulsion consisting of water, acetic acid (80% strength), a heavy fuel oil and a cationic surfactant prepared by reaction of whale fish acid oil and diethylene triamine, which surfactant contained imidazoline rings (IV). The weight ratio in the emulsion of heavy fuel oil and water was 1:2. Table C shows the capillary suction times obtained. All percentages given are based on weight of total digested sludge.

TABLE C

| Concentration of cationic surfactant IV | Heavy fuel oil, percent wt. | Water/ 80% acetic acid wt. ratio | Capillary suction time (C.S.T.), seconds |
|---|---|---|---|
| Percent wt.: | | | |
| 0.05 | 1 | 1:1 | 37.6 |
| 0.05 | 1 | 1:2 | 52.7 |
| 0.10 | 1 | 1:1 | 14.9 |
| 0.10 | 1 | 1:2 | 22.5 |
| 0.10 | 0.5 | 1:2 | 21.3 |
| 0.15 | 1 | 1:1 | 11.6 |
| 0.15 | 1 | 1:2 | 10.0 |
| 0.15 | 0.5 | 1:2 | 13.3 |
| 0.20 | 1 | 1:1 | 11.0 |
| 0.20 | 1 | 1:2 | 10.4 |

Capillary suction times below 20 seconds can be readily obtained with concentrations of cationic surfactant of 0.10% w. or higher.

EXAMPLE IV

The digested sewage sludge described in Example I was treated with an emulsion consisting of water (2 p.b.w.), acetic acid (80% strength, 1 p.b.w.), a cutback of a bitumen in kerosine (80 p.b.w. of bitumen–20 p.b.w. of kerosine) and surfactant IV. The weight ratio of cutback to water in the emulsion was 1:2. Three different types of bitumens were used viz. a 20/30 pen bitumen, a 90/110 pen bitumen and a propane bitumen. The amounts of cutback and surfactant added to the digested sludge were varied and the capillary suction times of the mixtures obtained were determined. The results of these tests are shown in Table D. Percentages given of cutbacks and cationic surfactant are based on total digested sludge.

TABLE D

| Concentration of cationic surfactant IV | Cutback of 20/30 pen bitumen, percent wt. | C.S.T., seconds | Cutback of 90/100 pen bitumen, percent wt. | C.S.T., seconds | Cutback of propane bitumen, percent wt. | C.S.T., seconds |
|---|---|---|---|---|---|---|
| Percent wt.: | | | | | | |
| 0.5 | 1 | 53.8 | 1 | 133.6 | 1 | 57.1 |
| 0.10 | 1 | 28.5 | 1 | 33.2 | 1 | 24.5 |
| 0.15 | 1 | 17.1 | 1 | 31.3 | 1 | 14.7 |
| 0.20 | 1 | 13.4 | 1 | 18.7 | 1 | 12.3 |
| 0.05 | 0.5 | 40.4 | 0.5 | 195.3 | 0.5 | 54.1 |
| 0.10 | 0.5 | 24.6 | 0.5 | 28.6 | 0.5 | 27.2 |
| 0.15 | 0.5 | 19.4 | 0.5 | 24.0 | 0.5 | 17.6 |
| 0.20 | 0.5 | 14.6 | 0.5 | 20.7 | 0.5 | 11.9 |

EXAMPLE V

A paper mill effluent containing 4000 mg./l. of suspended solids was treated with emulsions containing 3 p.b.w. of water, 1 p.b.w. of a cutback of propane bitumen in kerosene (weight ratio bitumen: kerosene 4:1), cationic surfactant IV and an amount of acetic acid (80% strength) equal in weight to the amount of the surfactant. The amount of surfactant IV (and correspondingly the amount of acetic acid) was varied in the emulsions. The emulsions were added to the paper mill effluent in such an amount that a concentration of cutback of 500 p.p.m. and concentrations of surfactant as recorded in Table E were reached. The mixtures so obtained were tested in the specific resistance to filtration test and the capillary suction test. Table E shows that an appreciable improvement in rate of filtration and capillary suction time is reached by addition of the emulsions according to the invention.

TABLE E

| Amount of surfactant (p.p.m. on total effluent) | Specific resistance to filtration, sec.$^2$ g.$^{-1}$ ×10$^{-7}$ | Capillary suction time, seconds |
|---|---|---|
| 0 | 16.5 | 18 |
| 50 | 12.3 | 12.8 |
| 40 | 12.3 | 13.2 |
| 30 | 12.3 | 13.7 |
| 25 | 12.3 | 15 |

EXAMPLE VI

To a digested sewage sludge obtained from a mixed domestic and industrial sewage and containing about 3% w. of solid material, were added several aqueous emulsions of cationic surfactant IV which contained cutbacks of 80 p.b.w. of propane bitumen and 20 p.b.w. of kerosene. In each emulsion an amount of acetic acid (80% strength) was present equal in weight to the amount of surfactant IV. The weight ratio of water and cutback in the emulsions was 3:1. The capillary suction time was measured from the mixtures obtained (Table F). Moreover the mixtures were investigated with the aid of the filter leaf test described, and the results of this test, viz the yield of dry solids in the filter cake (in kg./m.$^2$ leaf) and the water content of the filter cake are also recorded in Table F. The percentages of cationic surfactant IV and cutback given are based on total digested sludge.

TABLE F

| Amount of surfactant IV | Amount of cutback, percent wt. | Capillary suction time, seconds | Filter leaf test Yield dry solids, kg./m.$^2$ | Filter leaf test Water in filter cake, percent wt. |
|---|---|---|---|---|
| Percent wt.: | | | | |
|  |  | 53.6 | 0.091 | 72.8 |
| 0.2 | 2 | 6.1 | 0.793 | 63.1 |
| 0.2 | 1 | 6.6 | 0.570 | 69.0 |
| 0.1 | 2 | 6.4 | 0.583 | 68.5 |
| 0.1 | 1 | 6.7 | 0.454 | 72.8 |
| 0.05 | 1 | 13.0 | 0.217 | 69.3 |
| 0.2 | 2 |  | 0.489 | 65.8 |

EXAMPLE VII

To the digested sludge described in Example V, was added an emulsion which differed from the emulsion described in Example V only in that the acetic acid was replaced by concentrated (35%) hydrochloric acid. Table G shows the results of the capillary suction test. All percentages are based on total digested sludge.

TABLE G

| Amount of cutback | Amount of surfactant IV, percent wt. | Amount of hydrochloric acid, percent wt. | Capillary suction time, seconds |
|---|---|---|---|
| Percent wt.: | | | |
| 1 | 0.1 | 0.1 | 6.3 |
| 1 | 0.2 | 0.1 | 6.2 |
| 1 | 0.2 | 0.2 | 7.8 |

EXAMPLE VIII

For comparative purposes a digested sludge as described in Example I was treated with emulsions of a heavy fuel oil in water (weight ratio 1:3) containing either a nonionic and an anionic surfactant, and either with or without the addition of 0.5 p.b.w. acetic acid per p.b.w. water. The anionic surfactant consisted of sodium dodecyl sulfate (VI) and the nonionic surfactant of a polyoxyalkylene condensate (VII). From Table H, wherein the amounts of surfactant recorded are based on total digested sludge, it can be seen that no appreciable decrease in the capillary suction time is obtained.

TABLE H

| Surfactant | Amount of surfactant, percent wt. | Capillary suction time Without acetic acid | Capillary suction time With acetic acid |
|---|---|---|---|
| VI | 0.2 | 800 | 577 |
| VII | 0.2 | 672 | 429 |

I claim as my invention:

1. A process for dewatering an aqueous suspension of an organic waste material which comprises:
   (1) mixing said suspension with an acidified aqueous emulsion containing (a) from 10 to 100% by weight of a mineral oil based liquid having an initial boiling point above 200° C. and (b) from 0.01 to 10% by weight of an amino nitrogen-containing cationic surfactant or quaternary nitrogen-containing cationic surfactant, said weight percentages being based on the total weight of solids present in said suspension; and (2) subjecting said mixture to filtration thereby obtaining an aqueous phase substantially free from organic substances and an organic waste material concentrate of increased calorific value.

2. The process of claim 1 wherein the weight ratio of the mineral oil based liquid to the cationic surfactant is between 25 and 4.

3. The process of claim 2 wherein acidification of the emulsion is carried out with acetic or hydrochloric acid.

4. The process of claim 3 wherein the aqueous suspension of organic material is a sewage sludge or digested sewage sludge.

5. The process of claim 3 wherein the aqueous suspension of organic waste material is a paper mill effluent.

6. The process of claim 3 wherein the cationic surfactant is an N-alkyl propylene diamine, said alkyl groups containing from 10 to 24 carbon atoms.

7. The process of claim 3 wherein the cationic surfactant is alkyl imidazoline or alkyl imidazolidine, said alkyl group having from 10 to 24 carbon atoms.

8. The process of claim 6 wherein the mineral oil based liquid is a cutback of bitumen.

9. The process of claim 7 wherein the mineral oil based liquid is a cutback of bitumen.

References Cited

UNITED STATES PATENTS 3,412,018  11/1968  Monzie _____ 210—54 X
3,288,707  11/1966  Hurwitz et al. _____ 210—54 X FRANK A. SPEAR, Jr., Primary Examiner B. CASTEL, Assistant Examiner U.S. Cl. X.R.

210—54